United States Patent Office 3,445,508
Patented May 20, 1969

3,445,508
ACYL AND HYDROXY OR ALKANOYLOXY-4,7-METHANOINDENE DERIVATIVES
Morris Dunkel, Paramus, N.J., assignor to Universal Oil Products Company, Des Plaines, Ill., a corporation of Delaware
No Drawing. Filed Feb. 8, 1967, Ser. No. 614,560
Int. Cl. C07c *69/02, 49/04;* C11b *9/00*
U.S. Cl. 260—488                     9 Claims

ABSTRACT OF THE DISCLOSURE

Novel acyl and hydroxyl or acyloxy substituted 4,7-methanoindenes useful as perfume ingredients prepared by hydration of corresponding hydroxy and acetylenic substituted methanoindenes.

---

This invention relates to a new class of compounds, and to the preparational process therefor. More particularly, this invention relates to novel substituted 4,7-methanoindenes.

The novel 4,7-methanoindenes of this invention may be represented by the following structural formulae:

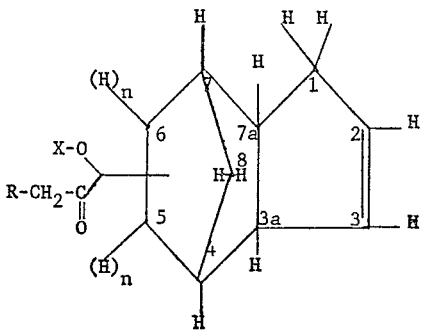

and

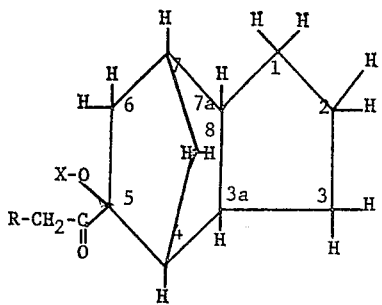

where X is selected from the group consisting of hydrogen and acyl and R is selected from the group consisting of hydrogen, alkyl and alkenyl, and $n$ is an integer of 0 or 2; provided, that for the carbon atom in the 5 or 6 position which is substituted with the substituents X—O— and

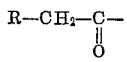

the integer associated therewith is 0 and the other integer is 2. Because of the existence of the double bond in the hexahydromethanoindene of this invention illustrated by structure I above, the positions 5 and 6 are not chemically equivalent, and accordingly, when the hexahydromethanoindene is substituted with the two substituents according to this invention, different isomeric compounds result depending upon whether the two substituents are on the 5 or 6 positioned carbon atom. The extremely close physical similarity of such isomeric compounds, moreover, prevents ready identification and separation from each other and for this reason it is intended that both isomeric compounds as well as mixtures thereof be encompassed within this invention by describing the hexahydromethanoindene in this specification and appended claims as hexahydromethanoindene substituted in one of the 5 and 6 positions with the two substituents. No comparable problem exists for the octahydromethanoindene of this invention illustrated by structure II above, inasmuch as there is no double bond in the cyclopentane portion of the molecule and the positions 5 and 6 are accordingly chemically equivalent. For this reason, the octahydromethanoindene is described in this specification and appended claims as being substituted with the two substituents in the 5 position. Both the hexahydro- and octahydromethanoindenes of this invention also exist in the exo and endo forms and it is intended that all of these isomeric compounds be encompassed within this invention.

The novel 4,7-methanoindenes of this invention find wide utility in the chemical field and are especially useful as plasticizers, ingredients of synthetic waxes and resins, perfume materials or as intermediates for drugs and insecticides. Of these many uses, however, one of the more valuable present uses for these compounds is in perfumery due to their highly pleasant, odorous nature. Accordingly, it is an object of this invention to provide a new class of compounds consisting of 4,7-methanoindenes having two specific substituents at one of the 5 and 6 positions. Another object is to provide a preparational process for these 4,7-methanoindenes. Other objects of this invention will be apparent from the following further detailed description thereof.

The 4,7-methanoindenes of this invention represented by structures I and II above, where X is hydrogen, may be prepared, in general, according to the process of this invention by hydrating corresponding methanoindenes substituted in one of the 5 and 6 positions with hydroxy and an acetylenic group, R—C≡C— where R has the same significance as indicated above and when R is alkyl or alkenyl it preferably contains from 1 to about 8 carbon atoms. In preparing the methanoindenes represented by structures I and II above where X is an acyl group, and preferably an acyl group containing from 1 to about 6 carbon atoms, the methanoindenes represented by structures I and II above where X is hydrogen may be esterified.

The hydration of a hydroxy and acetylenic substituted methanoindene to prepare the methanoindenes of this invention represented by structures I and II above where X is hydrogen may be illustrated by the following equation where an octahydromethanoindene is prepared:

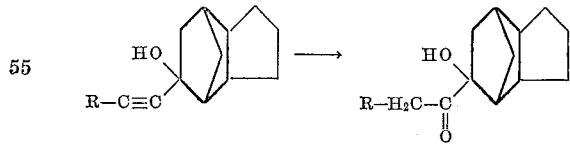

The 4-7-methanoindenes substituted in one of the 5 and 6 positions with hydroxy and with an acetylenic radical which are used in the hydration reaction illustrated above may be obtained by several different preparational methods. One method involves reacting a corresponding methanoindenyl ketone with an appropriate metal acetylide to obtain a reaction product which may be decomposed with water to form, for example, 5-ethynyl-5-hydroxy-2,3,3a,4,5,6,7,7a-octahydro-4,7-methanoindene. Examples of the hydroxy and acetylenic substituted methanoindenes which may be hydrated to form the compounds of this invention include octahydromethanoindenes such as 5-ethynyl-5-hydroxy-2,3,3a,4,5,6,7,7a - octahydro-4,7-methanoindene; 5-propynyl-5-hydroxy-2,3,3a,4,5,6,7,7a-octahydro-4,7-methanoindene; 5-butynyl-5-hydroxy-2,3,3a,4,5,6,7,7a-octahydro-4,7-methanoindene; or 5-1-buten-3-ynyl-5-hydroxy-2,3,3a,4,5,6,7,7a - octahydro-4,7-methanoindene; and hexahydromethanoindenes such as 3a,4,5,6,7,7a-hexahydro-4,7-methanoindene substituted in one of the 5 or 6 positions with hydroxy and ethynyl; 3a,4,5,6,7,7a-hexahydro-4,7-methanoindene substituted in one of the 5 or 6 positions with hydroxy and propynyl; 3a,4,5,6,7,7a-hexahydro-4,7-methanoindene substituted in one of the 5 or 6 positions with hydroxy and butynyl; 3a,4,5,6,7,7a-hexahydro-4,7-methanoindene substituted in one of the 5 or 6 positions with hydroxy and 1-buten-3-ynyl.

The conditions and procedures used in hydrating the acetylenic group of the hydroxy and acetylenic substituted methanoindenes may be widely varied. Generally, the hydration is readily effected by simply contacting the methanoindene reactant with water in the presence of a strong acid such as sulfuric, polyphosphoric or formic and a metallic salt such as mercury oxide or sulfate. A particularly preferred system to effect the hydration, however, is the combination of sulfuric acid and mercuric oxide. The quantity of the metallic salt and the acid used to effect the hydration is not important and may be widely varied. The temperature used to effect the hydration typically ranges from about 30° to 100° C. for reaction periods ranging from about 1 to about 5 hours. After the hydration is complete, the desired product may be recovered from the reaction mixture and purified by conventional methods including solvent extraction, distillation and crystallization. Examples of the methanoindenes represented by structures I and II of this invention where X is hydrogen include hexahydromethanoindenes such as 3a,4,5,6,7,7a-hexahydro-4,7-methanoindene substituted in one of the 5 and 6 positions with hydroxy and acetyl; 3a,4,5,6,7,7a-hexahydro-4,7-methanoindene substituted in one of the 5 and 6 positions with hydroxy and propionyl; 3a,4,5,6,7,7a-hexahydro-4,7-methanoindene substituted in one of the 5 and 6 positions with hydroxy and butyryl; 3a,4,5,6,7,7a-hexahydro-4,7-methanoindene substituted in one of the 5 and 6 positions with hydroxy and valeryl; or 3a,4,5,6,7,7a-hexahydro-4,7-methanoindene substituted in one of the 5 and 6 positions with hydroxy and caproyl; and octahydromethanoindenes such as 5-acetyl-5-hydroxy-2,3,3a,4,5,6,7,7a-octahydro-4,7-methanoindene; 5-propionyl-5-hydroxy-2,3,3a,4,5,6,7,7a-octahydro - 4,7 - methanoindene; 5-butyryl-5-hydroxy-2,3,3a,4,5,6,7,7a-octahydro-4,7 - methanoindene; 5 - valeryl-5-hydroxy-2,3,3a,4,5,6,7,7a-octahydro-4,7-methanoindene; or 5-caproyl-5-hydroxy-2,3,3a,4,5,6,7,7a-octahydro-4,7-methanoindene.

When the methanoindenes of this invention represented by structures I and II above, where X is acyl, are desired, then the corresponding methanoindenes of this invention where X is hydrogen prepared as above may be esterified by reaction with an acyl halide or acid anhydride. The acyl halide or acid anhydride which are used for this purpose have from 1 to about 6 carbon atoms in the acyl portion or portions of their molecules and include acetyl, propionyl, butyryl, or isocaproyl halides, for example, chlorides or the corresponding acid anhydrides thereof. The esterification reaction may be effected according to any of the standard esterification techniques. For example, the reaction may be effected by slowly adding the desired acyl halide or acid anhydride, preferably dissolved in a suitable solvent such as diethyl ether, to the hydroxy and acyl substituted methanoindene with the temperature being maintained at about 20° to 50° C. in the presence of an acid acceptor. A stoichiometric quantity of the acyl halide or the acid anhydride may be used although it is generally preferred to use a molar excess of the acyl halide or acid anhydride up to about 20 percent or more based upon the amount of the methanoindene reactant to insure desirable product yields. When the reaction is complete, the desired product is recovered from the reaction mixture by conventional means such as extraction and distillation. Example of the methanoindenes of this invention represented by structures I and II where X is an acyl group include hexahydromethanoindenes such as 3a,4,5,6,7,7a-hexahydro-4,7-methanoindene substituted in one of the 5 and 6 positions with acetyl and acetyloxy; 3a,4,5,6,7,7a-hexahydro-4,7-methanoindene substituted in one of the 5 and 6 positions with acetyl and propionyloxy; 3a,4,5,6,7,7a - hexahydro - 4,7-methanoindene substituted in one of the 5 and 6 positions with propionyl and butyryloxy; or 3a,4,5,6,7,7a-hexahydro-4,7-methanoindene substituted in one of the 5 and 6 postions with butyryl and isocaproyloxy; and octahydromethanoindenes such as 5-acetyl-5-acetyloxy-2,3,3a,4,5,6,7,7a-octahydro-4,7-methanoindene; 5-valeryl-5-caproyloxy-2,3,3a,4,5,6,7,7a-octahydro-4,7-methanoindene; or 5-acetyl-5-butyryloxy-2,3,3a,4,5,6,7,7a-octahydro-4,7 - methanoindene. The following examples are given to illustrate the compounds of this invention and the preparational process therefor. These examples are not intended, however, to limit the generally broad scope of this invention in strict accordance therewith.

Example I 5-acetyl-5-hydroxy - 2,3,3a,4,5,6,7,7a - octahydro - 4,7-methanoindene was prepared according to the process of this invention by the following procedure:

A reaction flask equipped with stirring means containing about 1.8 grams of mercuric oxide, 5.27 grams of sulfuric acid, and 68 grams of water, was heated to about 60° C. With vigorous stirring, 25 grams of 5-ethynyl-5-hydroxy - 2,3,3a,4,5,6,7,7a-octahydro-4,7-methanoindene was slowly added over a period of about 2 hours with the temperature maintained at about 60° C. The reaction mixture was stirred for about another hour at the same temperature and then cooled. The organic phase was extracted with toluene, washed with water and then dried over sodium sulfate. After removing toluene from the liquid product by distillation, the residue was fractionated to recover material boiling at 110° to 117° C. at 1 mm. Hg. This material was recrystallized from hexane to give 5 grams of product having a melting point of 89° to 90° C.

Example II 3a,4,5,6,7,7a-hexahydro-4,7-methanoindene substituted in one of the 5 and 6 positions with acetyl and hydroxy is prepared according to the process of this invention by the following procedure:

A reaction flask equipped with stirring means containing about 20 grams of mercuric oxide, 55 grams of sulfuric acid, and 700 grams of water, is heated to about 60° C. With vigorous stirring, 250 grams of 3a,4,5,6,7,7a-hexahydro-4,7-methanoindene substituted in one of the 5 and 6 positions with ethynyl and hydroxy is slowly added over a period of about 2 hours with the temperature maintained at about 60° C. The reaction mixture is stirred for about another hour at the same temperature and then cooled. The organic phase is extracted with toluene, washed with water and then dried over sodium sulfate. After removing toluene from the liquid product by distillation, the residue is fractionated to recover the desired product.

Example III 5-acetyl-5-acetyloxy - 2,3,3a,4,5,6,7,7a - octahydro - 4,7-methanoindene is prepared according to the following procedure:

About 5 grams of 5-hydroxy-5-acetyl-2,3,3a,4,5,6,7,7a-octahydro-4,7-methanoindene and 50 grams of pyridine are charged to a reaction flask equipped with stirring means. With stirring, about 5 grams of acetyl chloride are added while maintaining the temperature of the mixture at about 5° C. After the addition is complete, the stirring is continued for about 1 hour while maintaining such temperature. The mixture is allowed to stand overnight. Ice water is then added and the solution is extracted with diethyl ether. The extract is washed with water and a diluted hydrochloric acid solution. The diethyl ether solvent is then removed by distillation and the reaction residue thereafter subjected to vacuum fractionation to recover the product.

I claim as my invention:

1. A compound selected from the group consisting of 3a,4,5,6,7,7a-hexahydro-4,7-methanoindene and 2,3,3a,4,5,6,7,7a-octahydro-4,7-methanoindene which is substituted in one of the 5 and 6 positions both with a —O—X and with a

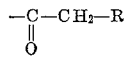

group where X is selected from the group consisting of hydrogen and lower alkanoyl and R is selected from the group consisting of hydrogen, alkyl and alkenyl.

2. The compound according to claim 1 characterized in that it is 3a,4,5,6,7,7a-hexahydro-4,7-methanoindene which is substituted in one of the 5 and 6 positions with the —O—X and

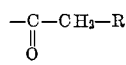

groups.

3. The compound according to claim 1 characterized in that it is 2,3,3a,4,5,6,7,7a-octahydro-4,7-methanoindene substituted in the 5 position with the —O—X and

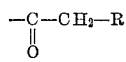

groups.

4. The compound according to claim 1 characterized in that X is hydrogen.

5. The compound according to claim 1 characterized in that R is alkyl of from 1 to about 8 carbon atoms.

6. The compound according to claim 1 characterized in that R is alkenyl of from 1 to about 8 carbon atoms.

7. The compound according to claim 1 characterized in that it is 5-acetyl-5-hydroxy-2,3,3a,4,5,6,7,7a-octahydro-4,7-methanoindene.

8. The compound according to claim 1 characterized in that it is 3a,4,5,6,7,7a-hexahydro-4,7-methanoindene substituted in one of the 5 and 6 positions with acetyl and hydroxy.

9. The compound according to claim 1 characterized in that it is 5-acetyl-5-acetyloxy-2,3,3a,4,5,6,7,7a-octahydro-4,7-methanoindene.

References Cited

UNITED STATES PATENTS

| | | | |
|---|---|---|---|
| 2,334,291 | 11/1945 | Ruzicka et al. | 260—488 |
| 2,560,921 | 7/1951 | Bergmann | 260—586 |
| 3,271,259 | 9/1966 | Saunders | 260—488 |

LORRAINE A. WEINBERGER, *Primary Examiner.*

V. GARNER, *Assistant Examiner.*

U.S. Cl. X.R.

252—522; 260—31.2, 32.8, 586, 999